US010560524B2

(12) United States Patent
Rodgers (10) Patent No.: US 10,560,524 B2
(45) Date of Patent: Feb. 11, 2020

(54) SYSTEM AND METHOD PROVIDING LOCAL DEVELOPMENT OF EXECUTABLE CONTENT PAGES NORMALLY RUN ON A SERVER WITHIN A USER SESSION

(71) Applicant: ORACLE INTERNATIONAL CORPORATION, Redwood Shores, CA (US)

(72) Inventor: Michael P. Rodgers, Rochester, MN (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 99 days.

(21) Appl. No.: 15/267,189

(22) Filed: Sep. 16, 2016

(65) Prior Publication Data

US 2018/0084043 A1    Mar. 22, 2018

(51) Int. Cl.
H04L 29/08    (2006.01)

(52) U.S. Cl.
CPC .......... H04L 67/1095 (2013.01); H04L 67/34 (2013.01); H04L 67/02 (2013.01)

(58) Field of Classification Search
USPC ........................................................ 709/220
See application file for complete search history.

(56) References Cited

U.S. PATENT DOCUMENTS

| | | | |
|---|---|---|---|
| 2011/0161477 A1* | 6/2011 | Kowalski | H04L 67/2823 709/223 |
| 2013/0173428 A1* | 7/2013 | Moser | G06Q 30/06 705/26.62 |
| 2014/0258858 A1* | 9/2014 | Hwang | G09B 5/062 715/716 |
| 2015/0100406 A1* | 4/2015 | Klimetschek | G06Q 30/0242 705/14.41 |
| 2016/0077901 A1* | 3/2016 | Roth | G06F 9/45529 719/328 |
| 2016/0080493 A1* | 3/2016 | Roth | G06F 9/45529 709/203 |
| 2016/0094497 A1 | 3/2016 | Javed et al. | |

* cited by examiner

*Primary Examiner* — Brian Whipple
*Assistant Examiner* — John Fan
(74) *Attorney, Agent, or Firm* — Kraguljac Law Group, LLC (57) ABSTRACT

Computerized embodiments are disclosed that provide for testing an executable content page, normally run in a server environment, on a local computing device. In one embodiment, replica application program interfaces are stored on a hard drive of the local computing device in a local file at a same relative path location as corresponding application program interfaces stored in the server environment. The replica application program interfaces emulate the functionality of, and have the same names and arguments as, the corresponding application program interfaces. When an executable content page is executed on the local computing device for testing, representative state transfer (REST) calls may be made to the server environment via the replica application program interfaces stored on the local hard drive. In this manner, changes to an executable content page can be made and tested locally, without having to first upload the executable content page to the server environment.

20 Claims, 4 Drawing Sheets

SYSTEM AND METHOD PROVIDING LOCAL DEVELOPMENT OF EXECUTABLE CONTENT PAGES NORMALLY RUN ON A SERVER WITHIN A USER SESSION

BACKGROUND

Enterprise resource planning (ERP) systems are implemented in a server environment and may be configured to allow users to create and edit executable content pages. Executable content pages can include a collection of, for example, hypertext markup language (HTML), javascript, and cascading style sheets (CSS) which can range in complexity from static content to executable content (e.g., javascript applications). Even though executable content pages are intended to be run in a server environment as part of an enterprise resource planning (ERP) system, today the executable content pages are often created and/or edited locally, and then uploaded to the enterprise resource planning (ERP) system for execution (e.g., testing). The process of uploading an executable content page to a server environment can be laborious and time consuming. Executable content pages are not allowed to be edited in the server environment because other users may be trying to access and use those executable content pages in an active, on-line enterprise resource planning (ERP) system.

When executed as part of an enterprise resource planning (ERP) system in a server environment, an executable content page may place representative state transfer (REST) calls within the server environment, running the calls as a currently authenticated user. A representative state transfer (REST) call is used to connect between machines (e.g., in the server environment). A representative state transfer (REST) call may access an application program interface (API) stored in a particular path location in the server environment as part of implementing the call.

The current user has to be logged in to the server environment in order for a representative state transfer (REST) call of an executable content file to be properly carried out. Having to be logged in as an authenticated user can create a problem, for example, when the user wants to edit and then test an executable content page during development. This is because the executable content page has to be edited locally, and then uploaded to the enterprise resource planning (ERP) system in the server environment to be tested. The representative state transfer (REST) calls do not work when viewing the coding artifacts of the executable content page locally in a browser off of a local hard drive of the user since there is no authenticated session. Therefore, to test even a minor edit to an executable content page, the user has to go through the laborious and time consuming process of uploading the executable content page to the server environment where an authenticated session can be established.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed that allow for local development (including local testing) of executable content pages, normally run in a server environment, which use representative state transfer (REST) calls. A representative state transfer (REST) call is used to connect between machines (e.g., in the server environment) by accessing an application program interface (API) stored in a particular path location in the server environment in order to implement the call.

In one embodiment, replica application program interfaces (APIs) are created and stored on a local hard drive of a local computing device where development of an executable content page is being performed. The replica application program interfaces (APIs) emulate a functionality of corresponding application program interfaces (APIs) stored in the server environment and have the same name and arguments as the corresponding application program interfaces (APIs). Also, the replica application program interfaces (APIs) are stored in a local file on the local hard drive of the local computing device in a same relative path location as the corresponding application program interfaces (APIs) in the server environment. As a result, executable content pages can be tested (executed) locally on the local computing device, including making representative state transfer (REST) calls to the server environment.

The following terms are used herein with respect to various embodiments.

The term "server environment", as used herein, refers to one or more server computers and associated devices hosting one or more applications (e.g., software applications of an enterprise resource planning (ERP) system) and can be accessed by multiple users.

The term "executable content page", as used herein, refers to a collection of, for example, hypertext markup language (HTML), javascript, and cascading style sheets (CSS) which can range in complexity from static content to executable content (e.g., javascript applications). Executable content pages are intended to be run in a server environment as part of an enterprise resource planning (ERP) system, in accordance with one embodiment.

The term "representative state transfer (REST) call", as used herein, refers to a programming step of an executable content page that is used to make a connection between machines (e.g., in a server environment). A representative state transfer (REST) call accesses an application program interface (API) stored in a file in a specified path location in order to implement the call, in accordance with one embodiment.

The term "local computing device", as used herein, refers to any type of user computer (e.g., desktop, mobile, workstation) that is or can be configured to access a remote server environment (e.g., a set of server computers hosting an enterprise resource planning (ERP) system) via a computer network (e.g., the Internet).

The term "replica application program interface", as used herein refers to an application program interface stored on a local hard drive of a local computing device which emulates the functionality of a corresponding application program interface stored in a server environment. The replica application program interface has the same name and arguments as the corresponding application program interface and is stored in a local file on the local hard drive of the computing device in a same relative path location as the corresponding application program interface stored in the server environment. The replica application program interface is used to implement a representative state transfer (REST) call of an executable content page being tested (executed) on the local computing device.

The term "user login session", as used herein, refers to the period of activity between a user logging in to and logging out of a multi-user server environment (e.g., which hosts enterprise resource planning (ERP) applications).

The term "token", as used herein, refers to a collection of information, received from a server environment in response to a token request, which allows successive representative state transfer (REST) calls to be made to the server environment within a same user login session.

Overview

Enterprise resource planning (ERP) systems (e.g., Oracle JD Edwards EnterpriseOne) are often implemented in a server environment, which can be accessed by multiple users, and may be configured to allow users to create and edit executable content pages. Executable content pages can include a collection of, for example, hypertext markup language (HTML), javascript, and cascading style sheets (CSS) which can range in complexity from static content to executable content (e.g., javascript applications).

Even though executable content pages are intended to be run in a server environment (e.g., as part of an enterprise resource planning (ERP) system), the executable content pages are created and/or edited locally. Users typically don't have file system access and permission to edit executable content pages in the server environment. This is because other users may be trying to access and use those executable content pages in an active, on-line enterprise resource planning (ERP) system, and because executable content pages are often propagated across multiple servers. The true copy often resides in compressed form in a database. Even in the case where a user does have file system access, the files on disk are really only cache files, and they are liable to get overwritten (erasing the user's changes) without warning at any time.

Therefore, a user (e.g., a content page developer) may copy an executable content page from a content page location in the server environment to a hard drive on a local computing device of the user. The user can then edit the executable content page on the local computing device. In one embodiment, as edits are being made by the user, the user can pause at any time and test the edits by executing the executable content page on the local computing device.

Even when the executable content page includes representative state transfer (REST) calls, the executable content page can be tested on the local computing device, in accordance with one embodiment, because the local computing device includes replica application program interfaces (APIs). The replica application program interfaces (API's) are used to implement the representative state transfer (REST) calls. Such local testing is possible because the replica application program interfaces (API's) are stored on a local hard drive of the local computing device and emulate the functionality of corresponding application program interfaces (API's) stored in the server environment which are normally used. The corresponding application program interfaces (API's) are part of a host application (or a conglomeration of host applications) in the server environment.

The replica application program interfaces (API's) have the same names and arguments as the corresponding application program interfaces (API's) and are stored in a local file on the local hard drive of the computing device in a same relative path location as the corresponding application program interfaces (API's) stored in the server environment. In this way, the local file gets loaded in the same way that a corresponding file having the corresponding application program interfaces (API's) would get loaded in the server environment, eliminating the need for coding artifact changes to allow for the execution content pages to run in the local environment versus the server environment (i.e., a same execution content page can run, as is, in either environment).

In this manner, the local computing device emulates a portion of the server environment, allowing execution content pages that are under development to be readily and easily tested in the user's local environment while still being able to place representative state transfer (REST) calls to the server environment as needed. Otherwise, an execution content page would have to be uploaded back to the server environment before testing, even when wanting to test a minor editing change (e.g., to fix a minor syntax error).

Uploading an execution content page back to the server environment can be a laborious and time consuming process (including zipping up the executable content page, accessing a page manager application, uploading the zipped executable content page to the server environment, and previewing the executable content page in the server environment). Having to upload an execution content page back to the server environment before testing tends to drive developers to alter the development practice to do much more monolithic and less incremental code-test-debug iterations, ultimately making the development process much more time-consuming and frustrating. Therefore, it is desirable to do frequent incremental testing using the replica API's and to perform the uploading only once, after all editing and testing (i.e., development) has been completed in the local environment (i.e., after the user has verified, in the local environment, that everything is working correctly). Each upload of an executable content page to the server environment can take several minutes. However, an edited executable content page can be tested in the local environment within a few seconds, in accordance with one embodiment.

DETAILED DESCRIPTION WITH RESPECT TO THE DRAWINGS

Figure 1:
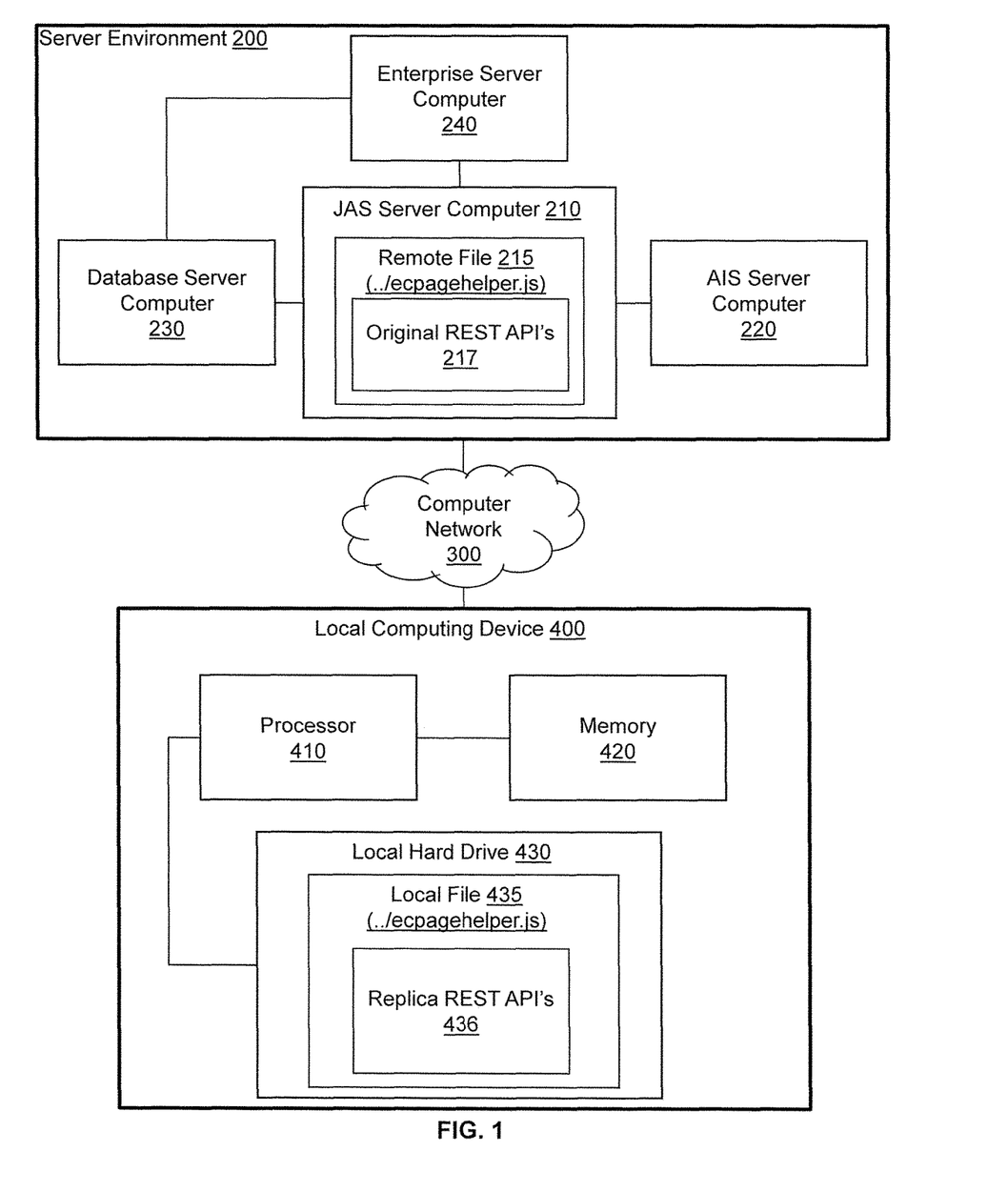
FIG. 1 illustrates one embodiment of a computer system, having a local computing device configured to communicate with a server environment via a computer network, to allow local development of executable content pages that are normally executed in the server environment.

FIG. 1 illustrates one embodiment of a computer system 100, having a server environment 200, a computer network 300 (e.g., the Internet), and a local computing device 400. The local computing device 400 (e.g., a desktop computer, a mobile computer, a work station) is configured to communicate with the server environment 200 via the computer network 300, to allow local development of executable content pages that are normally executed in the server environment 200.

In the embodiment of FIG. 1, the server environment 200 includes a conglomeration of server computers including a java application server (JAS) computer 210, an application interface services (AIS) server computer 220, a database server computer 230, and an enterprise server computer 240. The server computers 210, 220, 230, and 240 are configured to host and run an application suite (e.g., for enterprise resource planning (ERP)), forming an ERP system that can be accessed by multiple users. In accordance with one embodiment, the JAS server computer 210 is configured to communicate with the other server computers 220, 230, and 240. Furthermore, the database server computer 230 and the enterprise server computer 240 are configured to communicate with each other.

The JAS server computer 210 provides a web server functionality such that a web browser of the local computing device 400 can communicate with the JAS server computer 210. A user of the local computing device 400 can log in to the server environment 200 via the JAS server computer 210 with a user name and a password to create a user login session. As a result, a user can view and run executable content pages as well as enterprise resource planning (ERP) applications provided by the server environment 200 under the control of the local computing device 400.

In accordance with one embodiment, the AIS server computer 220 provides a representative state transfer (REST) layer such that the JAS server computer 210 can interact with the AIS server computer 220 via REST calls. REST calls are made using an original set of REST API's 217 in a remote file 215 (e.g., a javascript file named ecpagehelper.js) in a specified path location (e.g., ../ecpagehelper.js) on the JAS server computer 210. The ".." in "../ecpagehelper.js" refers to the parent directory (on the JAS server computer 210) of the specified path location. In one embodiment, the remote file 215 (ecpagehelper.js) is a server-side javascript file that includes the REST API's. The REST calls result in the running of applications in the server environment 200 which provide data back in response to the REST calls, in accordance with one embodiment.

In one embodiment, the REST API's are stored in the database server computer 230 and are pulled into the JAS server computer 210 and unpacked as needed. The database server computer 230 may store other routines, protocols, tools, and data associated with, for example, an ERP system. The enterprise server computer 240 is configured to provide ERP-specific programs or applications that are integrated to serve the needs of multiple users of, for example, an enterprise. Such integrated programs and applications allow management of the enterprise and automate internal functions related to, for example, human resources and technology.

The local computing device 400 includes a processor 410, a memory 420, and a local hard drive 430. For example, in one embodiment, computer-executable instructions may be loaded from the local hard drive 430 into the memory 420 and may be accessed from the memory 420 by the processor 410 which executes the computer-executable instructions. In accordance with one embodiment, a replica set of REST API's 436 reside in a local file 435 (e.g., ecpagehelper.js) in a specified path location (e.g., ../ecpagehelper.js) on the local hard drive 430 of the local computing device 400. The ".." in "../ecpagehelper.js" refers to the parent directory (on the local computing device 400) of the specified path location.

In this way, the relative path locations of the local file 435 and the remote file 215 are the same. In one embodiment, the parent directory on the local computing device 400 is where a user is performing development of an executable content page.

The local file 435 (ecpagehelper.js) is similar to the remote file 215 (ecpagehelper.js) in the server environment 200. However, the local file 435 is modified to include constant parameters that include a username, a user password, and a server address of the JAS server computer 210, in accordance with one embodiment. The local file 435 is also modified with initiation (init) code that establishes a user login session using the constant parameters. The local file 435 is also configured to override the normal implementation for executing calls to the REST API's. The user login session established based on the constant parameters in the local file 435 is used for executing the calls rather than the normally assumed user login session.

The remote file 215 may be modified to form the local file 435. For example, in one embodiment, modification of the remote file 215 to form the local file 435 may performed manually by copying and editing the remote file 215. In another embodiment, modification of the remote file 215 to form the local file 435 may be performed semi-automatically via, for example, an installer utility (e.g., implemented as a set-up wizard) that runs and prompts a user for the information to modify the file.

In accordance with one embodiment, the replica REST API's 436 emulate the functionality of the corresponding original REST API's 217 in the server environment. The replica REST API's 436 also have the same name and arguments (same number of arguments, same order of arguments, same expected types and values of arguments) as the corresponding original REST API's 217. Furthermore, the local file 435 is stored on the local hard drive 430 in a same relative path location (e.g., ../ecpagehelper.js) as the remote file 215 in the server environment 200. Only the parent directories ".." are different. The replica REST API's 436 return results in the same format as the corresponding original REST API's 217 in the server environment. In one embodiment, the replica REST API's 436 are direct copies of the original REST API's 217 in the server environment 200 which are placed in the local file 435.

In this manner, the local file 435 gets loaded in the same way that the corresponding remote file 215, having the corresponding application program interfaces 217, would get loaded in the server environment 200. As a result, the need for coding artifact changes to allow for execution content pages to run in the local environment versus the server environment is eliminated (i.e., a same execution content page can run, as is, in either environment). Further details of the system 100 of FIG. 1 are discussed next herein with respect to FIG. 2 and FIG. 3.

Figure 2:
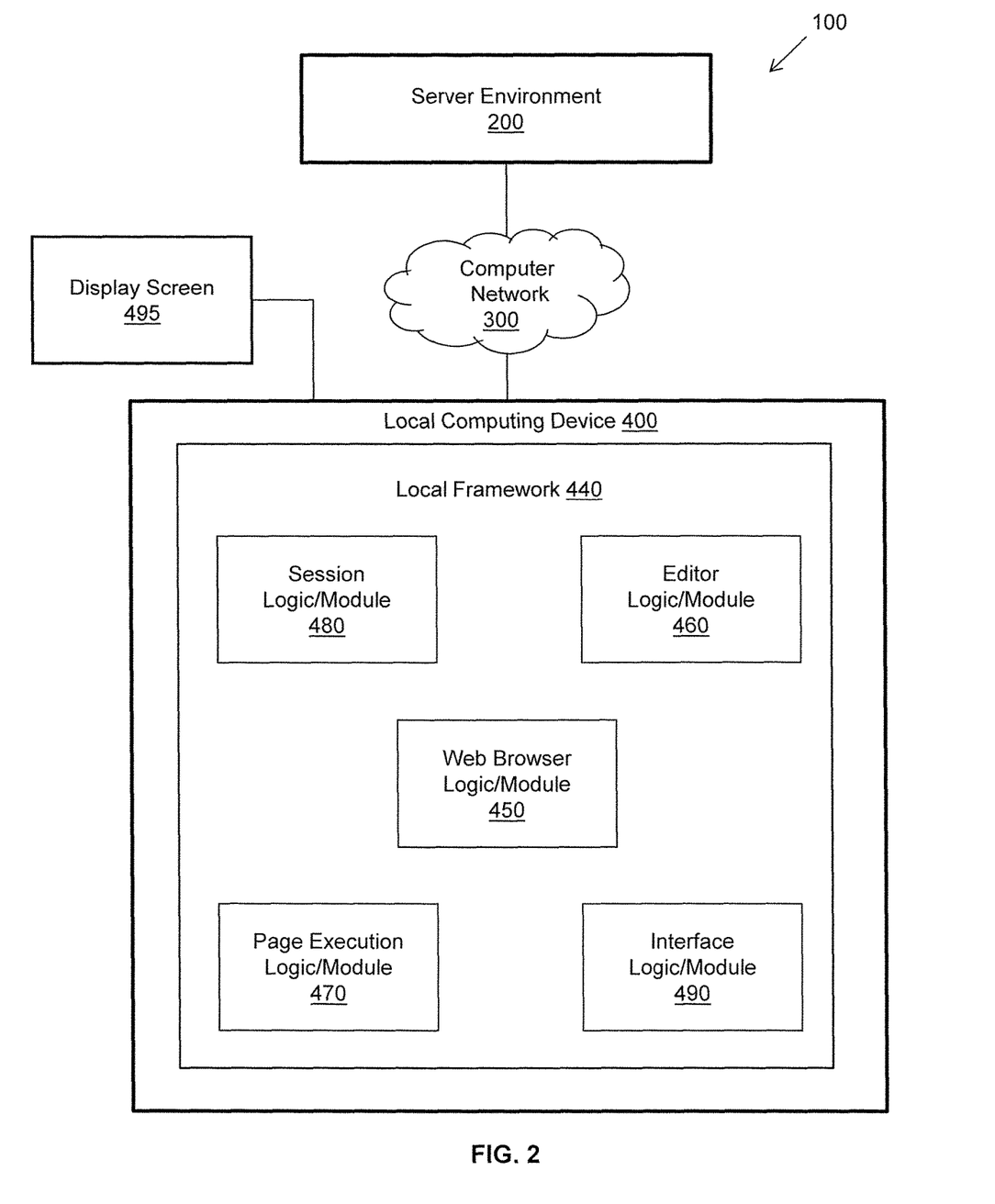
FIG. 2 illustrates one embodiment of the computer system of FIG. 1 showing a local framework of the local computing device that is configured to allow for the local development of the executable content pages.

FIG. 2 illustrates one embodiment of the computer system 100 of FIG. 1 showing a local framework 440 of the local computing device 400 that is configured to allow for the local development of executable content pages. In one embodiment, the system 100 is a computing/data processing system including an application or collection of distributed applications for enterprise organizations. The applications and computer system 100 may be configured to operate with or be implemented as a cloud-based networking system, a Software as a Service (SaaS) architecture, or other type of computing solution.

The local framework 440 is configured to computerize the process of locally developing executable content pages. In one embodiment, a set of REST API's in the server environment 200 are effectively replicated in the local computing device 400. The REST API's are replicated in the local computing device 400 in a manner that allows a same execution content page to run, as is, in the local environment of the local computing device 400 during development and in the server environment 200 after the execution content page is uploaded after development.

With reference to FIG. 2, in one embodiment, the local framework 440 is implemented on the local computing device 400 and includes logics or modules for implementing various functional aspects of the local framework 440. In one embodiment, the local framework 440 includes web browser logic/module 450, editor logic/module 460, page execution logic/module 470, session logic/module 480, and interface logic/module 490.

Other embodiments may provide different logics or combinations of logics that provide the same or similar functionality as the local framework 440 of FIG. 2. In one embodiment, the local framework 440 is an executable application including algorithms and/or program modules configured to perform the functions of the logics. The application is stored in a non-transitory computer storage medium (e.g., the memory 420). That is, in one embodiment, the various logics of the local framework 440 are implemented as modules of instructions stored on a computer-readable medium which can be executed by the processor 410.

The local computing device 400 is also operably connected to a display screen 495. In accordance with one embodiment, the display screen 495 is implemented to display views provided by and facilitate user interaction with the local computing device 400 and the server environment 200 (e.g., via graphical user interfaces provided by the local computing device 400 and/or the server environment 200). For example, an executable content page may be presented to a user on the display screen 495 via a graphical user interface.

Referring again to FIG. 2, in one embodiment, web browser logic 450 is configured to provide web-based communications with the server environment 200 via the computer network 300. For example, in one embodiment, web browser logic 450 is configured to communicate user commands from the local computing device 400 to the server environment 200 via the computer network 300 to copy an executable content page from a content page location in the server environment 200 to the local hard drive 430 of the local computing device 400.

Executable content pages exist in the server environment 200 to be served up by a web server portion of the server environment 200 to provide interactive transactional applications to the local computing device 400 via web browser logic 450 (e.g., when a user accesses and runs business applications in the server environment via the local computing device). Such applications may provide, for example, information look-up capability with a dashboard summary, or allow searching by category. Furthermore, in one embodiment, web browser logic 450 is configured to upload (e.g., subsequent to testing) the executable content page from the local computing device 400 to the content page location in the server environment 200 in response to other user commands.

In one embodiment, editor logic 460 is configured to edit an executable content page on the local computing device 400 in response to user commands. For example, a developer may make edits to hypertext markup language (HTML), javascript, and/or cascading style sheets of an executable content page via editor logic 460. In one embodiment, editor logic 460 provides text editing capability. In one embodiment, page execution logic 470 is configured to receive an executable content page from editor logic 460 and run the executable content page in order to test the executable content page. The executable content page may include executable coding instructions that include representative state transfer (REST) calls.

In one embodiment, session logic 480 is configured to establish a user login session with the server environment 200, via web browser logic 450, over the computer network 300. For example, when a user executes an executable content page via page execution logic 470 on the local computing device 400 to test the executable content page, a first REST call within the executable content page may be encountered. Prior to actually making the first REST call, a token request is generated by session logic 480, in response to page execution logic 470 encountering the first REST call, and is communicated to the server environment 200 via web browser logic 450 over the computer network 300. The token request includes a user name, a password, and a server address which is accessed by session logic 480 from the local file 435 stored on the local hard drive 430.

In response to communicating the token request to the server environment 200, the user login session is established with the server environment 200 and the server environment 200 sends a token back to the local computing device 400 over the computer network 300. The token is received through web browser logic 450 and is communicated to session logic 480. The token request includes information for allowing subsequent REST calls within the executable content page to be made within the same user login session. That is, when any subsequent REST call (after the first REST call) is sent out to the server environment 200, the token is inserted in or attached to the REST call such that the server environment 200 recognizes that the REST call is to be made within the same user login session. In one embodiment, information about the user login session (including the token) is stored in the memory 420 of the local computing device 400.

Once the user login session is initially established, the first REST call can be made to the server environment 200 and a result of the first REST call may be returned to the local computing device 400 from the server environment 200 as result data. Again, any REST calls made after the first REST call are made within the same user login session using the token. Other ways of establishing a user login session are possible as well, in accordance with other embodiments (e.g., using a session ID type). For example, in one embodiment, instead of waiting for the first REST call in an executable content page to be encountered, session logic 480 can execute code that establishes a user login session up front and receive a token back in response to page execution logic 470 first attempting to execute the executable content page.

In one embodiment, interface logic 490 is configured to actually make the REST calls to the server environment 200, via web browser logic 450, by accessing and executing the replica API's 436. The replica API's 436 are stored on the local hard drive 430 of the local computing device 400 in the local file 435 as described previously herein. The replica API's 436 emulate the functionality of the corresponding original API's 217 stored in the remote file 215 in the server environment 200 and have the same name and arguments as the corresponding original API's 217. The replica API's 436 are stored in the local file 435 on the local hard drive 430 of the local computing device 400 in a same relative path location (e.g., ../ecpagehelper.js) as the corresponding original API's 217 stored in the server environment, as described previously herein. Interface logic 490 is also configured to receive result data from the server environment 200 via web browser logic 450 in response to making a REST call.

In this manner, the local framework 440 allows executable content pages to be edited and tested (i.e., developed) on the local computing device 400 while still being able to make REST calls to the server environment 200 and get result data back. As such, a developer can edit and test an executable content page quickly and efficiently many times in the local environment before having to go through the laborious and time consuming process of uploading the executable content page to the server environment 200.

Figure 3:
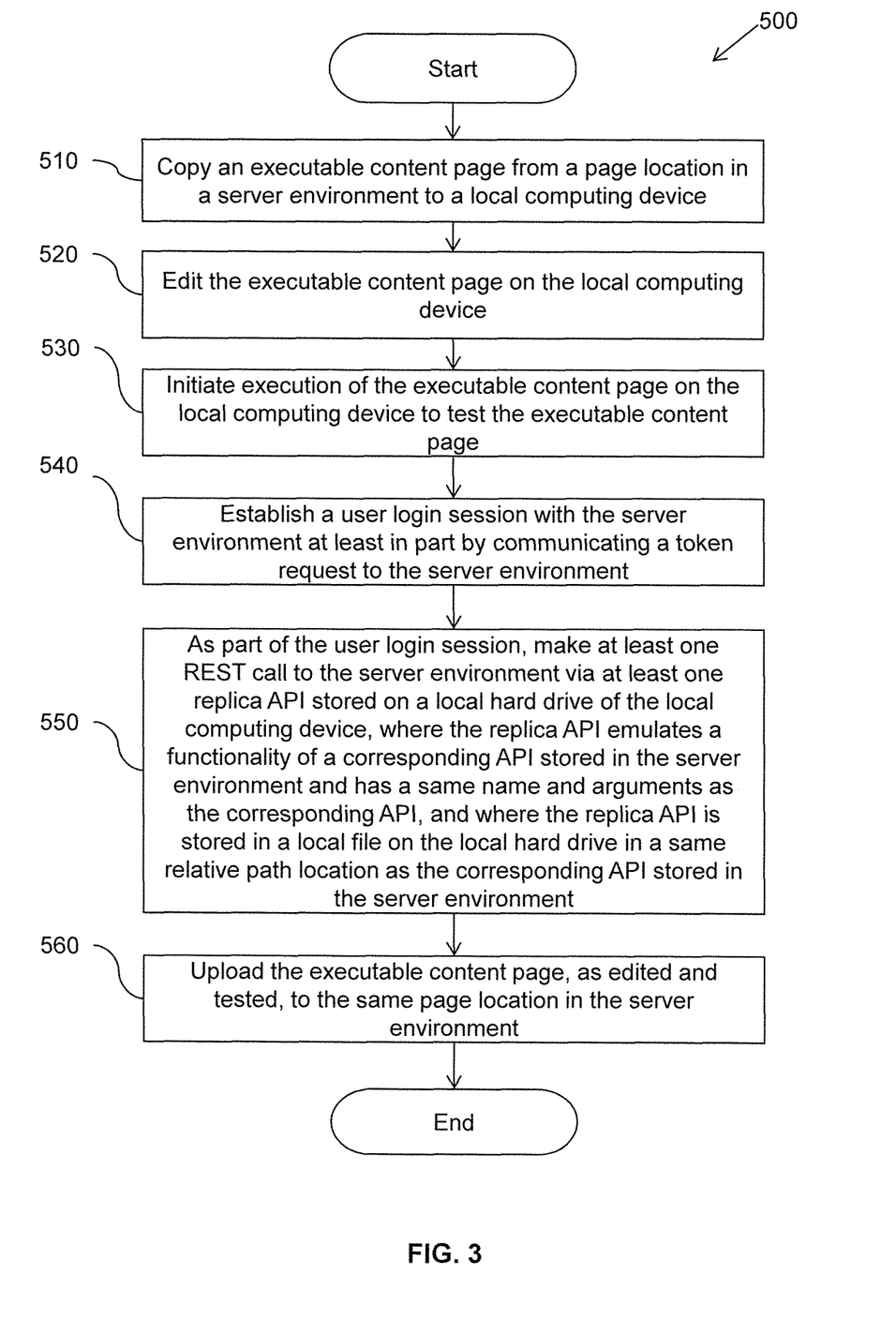
FIG. 3 illustrates one embodiment of a method, which can be performed by the local computing device of FIG. 1 and FIG. 2, to develop the executable content pages that are normally executed in the server environment of FIG. 1 and FIG. 2.

FIG. 3 illustrates one embodiment of a method 500, which can be performed by the local computing device 400 of FIG. 1 and FIG. 2, to develop executable content pages that are normally executed in the server environment 200 of FIG. 1 and FIG. 2. An executable content page is configured to be "served up" by a web server portion of the server environment 200 to provide interactive transactional applications to the local computing device 400, in accordance with one embodiment.

Method 500 describes operations of the local framework 440 and is implemented to be performed by the local framework 440 of FIG. 2, or by a computing device configured with an algorithm of the method 500. For example, in one embodiment, method 500 is implemented by a computing device configured to execute a computer application. The computer application is configured to process data in electronic form and includes stored executable instructions that perform the functions of method 500.

Method 500 will be described from the perspective that the local framework 400 is provided which allows a user to develop (edit and test) executable content pages locally without having to first upload the executable content pages to the server environment 200 before testing. REST calls in the executable content pages can still be made to the server environment 200, even though the executable content pages are not being executed in the server environment 200 during development.

Upon initiating method 500, at block 510, an executable content page is copied from a content page location in the server environment 200 to the local hard drive 430 of the local computing device 400. The copying may be accomplished, at least in part, by communicating user commands from the local computing device 400 to the server environment 200 via web browser logic 450, in accordance with one embodiment.

At block 520, the executable content page is edited on the local computing device 400 (e.g., by editor logic 460) in response to user commands. A user may make one edit or many edits before deciding to test the executable content page locally. In accordance with one embodiment, when a user is finished editing an executable content page, the user may select F5 on a computer keyboard of the local computing device 400 to refresh the user's web browser to test/debug the executable content page. At block 530, execution of the executable content page is initiated on the local computing device 400 to test the executable content page (i.e., to test the effects of the editing). In one embodiment, page execution logic 470 executes the executable content page on the local computing device 400.

At block 540, during or in response to execution of the executable content page, a user login session is established with the server environment 200. The user login session is established by communicating a token request to the server environment 200. The token request includes at least a user name, a password, and a server address that are stored in the local file 435 on the local hard drive 430 of the local computing device 400. In response to communicating the token request to the server environment 200, a token is received back at the local computing device 400 form the server environment 200. The token includes information that allows subsequent REST calls to be made within the same user login session.

At block 550, during execution of the executable content page, and as part of the user login session, at least one REST call is made to the server environment 200 (e.g., over the computer network 300) via at least one replica API stored on the local hard drive 430 of the local computing device 400. The replica API emulates the functionality of a corresponding original API stored in the server environment and has a same name and arguments as the corresponding original API. The replica API is stored in the local file 435 in a same relative path location (e.g., ../ecpagehelper.js) at the corresponding original API stored in the server environment 200. In accordance with one embodiment, when page execution logic 470 encounters a REST call while executing an executable content page, page execution logic 470 triggers interface logic 490 to access the appropriate replica API from the local hard drive 430 and make the REST call to the server environment 200. The REST call may result in running an ERP application in the server environment 200, in accordance with one embodiment. Result data may be returned, as describe previously herein, in response to the REST call.

At block 560, once development of the executable content page is complete, the executable content page is uploaded to the same content page location in the server environment 200, in response to user commands, from where the executable content page was copied at block 510. In accordance with one embodiment, web browser logic 450 is used to upload the executable content page. The newly uploaded executable content page replaces the previous version of the executable content page in the content page location of the server environment. Even though the executable content page was tested in the local environment on the local computing device 400, the user (developer) may desire to test the executable content page again, but in the server environment 200. Such additional testing may be performed as an extra precaution to ensure that everything is working properly.

In this manner, the process of developing executable content pages is enhanced by improving a local computing device. The local computing device is improved by incorporating a local framework for testing executable content pages that have REST calls, and by configuring a local hard drive with replica API's in a local file at a relative path location that mirrors a path location in a server environment where the executable content pages are normally run. Overhead in testing code is greatly reduced as code is being written by a developer. What used to be accomplished in about two (2) minutes may now take less than a second. Raw time savings is achieved and the manner in which a developer develops executable content pages is fundamentally altered. Changing and testing one line of code is no longer prohibitively expensive. Therefore, the developer can test frequently. The time spent debugging is much less because the developer can perform incremental testing and isolate a problem immediately to the most recently written code. The improvement to the local computing device is effectively a new technology interface (e.g., a new communication interface) that allows for more efficient user coding and testing of executable content pages.

Computing Device Embodiment

Figure 4:
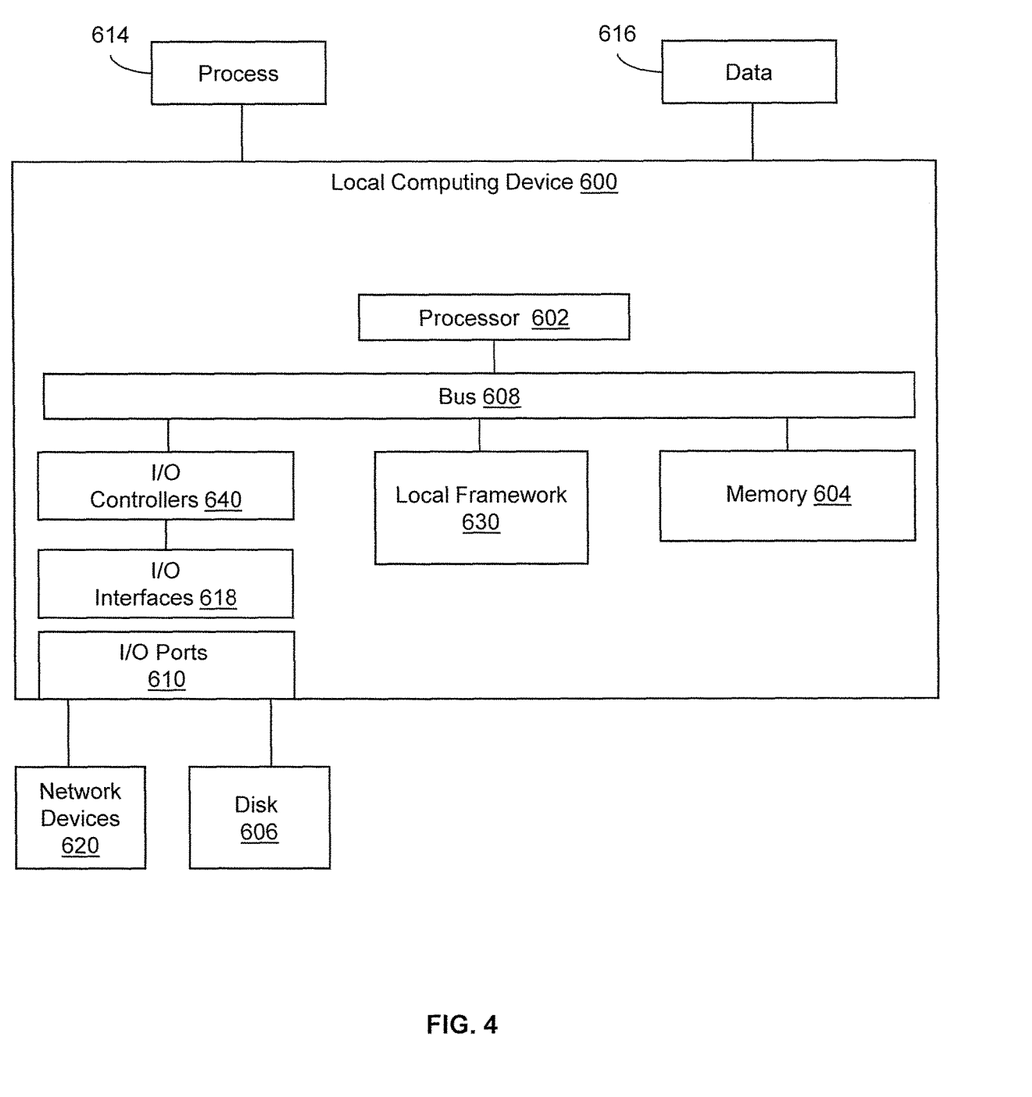
FIG. 4 illustrates an example embodiment of a local computing device upon which the local framework of FIG. 2 may be implemented.

FIG. 4 illustrates an example local computing device that is configured and/or programmed with one or more of the example systems and methods described herein, and/or equivalents. FIG. 4 illustrates one example embodiment of a local computing device upon which an embodiment of a local framework may be implemented. The example local computing device may be a computer 600 that includes a processor 602 and memory 604 operably connected by a bus 608.

In one example, the computer 600 may include a local framework 630 (corresponding to the local framework 440 from FIG. 2) configured to allow development (including testing) of an executable content page, normally run in a server environment, on the local computing device. In different examples, framework 630 may be implemented in hardware, a non-transitory computer-readable medium with stored instructions, firmware, and/or combinations thereof. While framework 630 is illustrated as a hardware component attached to the bus 608, it is to be appreciated that in other embodiments, framework 630 could be implemented in the processor 602, a module stored in memory 604, or a module stored in disk 606.

In one embodiment, framework 630 or the computer 600 is a means (e.g., structure: hardware, non-transitory computer-readable medium, firmware) for performing the actions described. In some embodiments, the local computing device may be a server operating in a cloud computing system, a server configured in a Software as a Service (SaaS) architecture, a smart phone, laptop, tablet computing device, and so on.

The means may be implemented, for example, as an ASIC programmed to support local development of an executable content page. The means may also be implemented as stored computer executable instructions that are presented to computer 600 as data 616 that are temporarily stored in memory 604 and then executed by processor 602.

Framework 630 may also provide means (e.g., hardware, non-transitory computer-readable medium that stores executable instructions, firmware) for making representative state transfer (REST) calls from the local computing device to a server environment via replica application program interfaces (APIs) stored on a local hard drive (e.g., disk 606) of the local computing device.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be a hard drive. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Systems, methods, and other embodiments have been described that are configured to allow development (including testing) of an executable content page, normally run in a server environment, on a local computing device. In one embodiment, a local computing device includes a processor and a local hard drive. The local hard drive stores a replica application program interface (API). The replica application program interface (API) emulates the functionality of a corresponding application program interface (API) stored in a server environment and has the same name and arguments as the corresponding application program interface (API). The replica application program interface (API) is stored in a local file on the local hard drive in a same relative path location as the corresponding application program interface (API) in the server environment. The local computing device also includes web browser logic configured to communicate with the server environment. The local computing device further includes page execution logic configured to run an executable content page for testing the executable content page. The executable content page has executable coding instructions including a representative state transfer (REST) call. The local computing device also includes interface logic configured to make the representative state transfer (REST) call to the server environment via the replica application program interface (API) through the web browser logic.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a local computing device where the local computing device includes at least a processor for executing instructions from a memory, the method comprising:
    testing an executable content page, having executable coding instructions that include at least one representative state transfer (REST) call that communicates with a server, wherein the testing includes at least:
        begin executing, via at least the processor of the local computing device, the executable content page on the local computing device;
        in response to the processor encountering a first REST call in the executable content page during the executing, establishing, by the local computing device, a login session with a server environment prior to executing the first REST call;
        wherein the login session is established based on at least parameters from a local file that overrides execution of the first REST call that is configured to establish a different login session;
        after establishing the login session, continue the executing of the first REST call by triggering at least one replica application program interface (API) stored on a local hard drive of the local computing device,
        where the at least one replica application program interface (API) executes the first REST call to the server environment via the login session established, and receives result data from the server environment to allow the executable content page to be executed and tested on the local computing device; and
        in response to encountering subsequent REST calls during the executing of the executable content page, executing the subsequent REST calls to the server environment using the same login session instead of the different login session.

2. The method of claim 1, wherein the at least one replica application program interface (API):
    emulates a functionality of at least one corresponding application program interface (API) stored in the server environment and has the same name and arguments as the at least one corresponding application program interface (API), and
    is stored in a local file on the local hard drive in a same relative path location as the at least one corresponding application program interface (API) stored in the server environment.

3. The method of claim 1,
    wherein establishing the login session with the server environment, comprises: via at least the processor, communicating a token request to the server environment, wherein the token request includes at least a user name, a password, and a server address, and where the user name, the password, and the server address are stored in the local file; and
    in response to communicating the token request, receiving a token from the server environment, via at least the processor, where the token is inserted in or attached to subsequent representative state transfer (REST) calls for allowing the subsequent representative state transfer (REST) calls to be made within the same login session.

4. The method of claim 1, wherein the executable content page includes at least one of javascript, hypertext markup language (HTML), and cascading style sheets (CSS).

5. The method of claim 1, wherein executing the first representative state transfer (REST) call to the server environment results in running an enterprise resource planning (ERP) application in the server environment.

6. The method of claim 1, further comprising, in response to executing the at least one representative state transfer (REST) call, receiving, via at least the processor, data from the server environment.

7. The method of claim 1, wherein the executable content page is configured to be served up by a web server portion of the server environment to provide interactive transactional applications to the local computing device.

8. The method of claim 1, wherein the at least one representative state transfer (REST) call is made to the server environment over a computer network.

9. The method of claim 1, further comprising, prior to the testing, communicating first user commands from the local computing device to the server environment, via at least the processor, to copy the executable content page from a content page location in the server environment to the hard drive of the local computing device.

10. The method of claim 9, further comprising uploading, via at least the processor and subsequent to the testing, the executable content page to the content page location in the server environment in response to second user commands.

11. A local computing device, comprising:
    a processor;
    a local hard drive storing at least one replica application program interface (API) that:
        emulates a functionality of at least one corresponding application program interface (API) stored in a server environment and has the same name and arguments as the at least one corresponding application program interface (API), and
        is stored in a local file on the local hard drive in a same relative path location as the at least one corresponding application program interface (API) stored in the server environment;
    a web browser module stored in a non-transitory computer-readable medium and including instructions that when executed by the processor cause the processor to communicate with the server environment;
    a page execution module stored in the non-transitory computer-readable medium and including instructions that when executed by the processor cause the processor to:
        begin executing an executable content page for testing the executable content page on the local computing device, where the executable content page has executable coding instructions including at least one representative state transfer (REST) call;
        in response to the processor encountering a first representative state transfer (REST) call in the executable content page during the executing, establish a login session with the server environment prior to executing the first representative state transfer (REST) call from the executable content page;
        wherein the login session is established based on at least parameters from a local file that overrides execution of the first REST call that is configured to establish a different login session;

after establishing the login session, executing the first representative state transfer (REST) call via the at least one replica application program interface (API) stored on a local hard drive of the local computing device, where the at least one replica application program interface (API) executes in part the first representative state transfer (REST) call to the server environment via the login session established and receives result data from the server environment to allow the executable content page to be executed and tested on the local computing device; and in response to encountering subsequent REST calls during the executing of the executable content-page, executing the subsequent REST calls to the server environment using the same login session instead of the different login session.

12. The local computing device of claim 11, further comprising an editor module stored in the non-transitory computer-readable medium and including instructions that when executed by the processor cause the processor to edit the executable content page on the local computing device in response to user commands.

13. The local computing device of claim 11, further comprising a session module stored in the non-transitory computer-readable medium and including instructions that when executed by the processor cause the processor to:

prior to executing the first representative state transfer (REST) call, establish the login session with the server environment, via the web browser module, at least in part by communicating a token request to the server environment, wherein the token request includes at least a user name, a password, and a server address, and where the user name, the password, and the server address are stored in the local file; and in response to communicating the token request, receive a token from the server environment via the web browser module, where the token is inserted in or attached to subsequent representative state transfer (REST) calls for allowing the subsequent representative state transfer (REST) calls to be executed within the same login session.

14. The local computing device of claim 11, further comprising an interface module that includes instructions that when executed by the processor cause the processor to receive data from the server environment via the web browser module in response to executing the first representative state transfer (REST) call.

15. The local computing device of claim 11, wherein the executable content page is configured to be served up by a web server portion of the server environment to provide interactive transactional applications to the local computing device via the web browser module.

16. The local computing device of claim 11, wherein the web browser module includes instructions that when executed by the processor cause the processor to communicate first user commands from the local computing device to the server environment via a computer network to copy the executable content page from a content page location in the server environment to the hard drive.

17. The local computing device of claim 16, wherein the web browser module includes instructions that when executed by the processor cause the processor to upload, subsequent to the testing, the executable content page to the content page location in the server environment in response to second user commands.

18. A non-transitory computer-readable medium storing instructions that when executed by one or more processors of a local computing device, cause the local computing device to at least:

testing an executable content page, having executable coding instructions that include at least one representative state transfer (REST) call that communicates with a server, wherein the testing includes at least:

begin executing, via at least the processor, the executable coding instructions on the local computing device;

in response to the processor encountering a first REST call in the executable content page during the executing, establishing a login session with a server environment prior to executing the first REST call;

wherein the login session is established based on at least parameters from a local file that overrides execution of the first REST call that is configured to establish a different login session;

after establishing the login session, continue the executing of the first REST call by triggering at least one replica application program interface (API) stored on a local hard drive of the local computing device, where the at least one replica application program interface (API): (i) executes the first REST call to the server environment via the login session established, and (ii) receives result data from the server environment to allow the executable content page to be executed and tested on the local computing device; and in response to encountering subsequent REST calls during the executing of the executable content page, executing the subsequent REST calls to the server environment using the same login session instead of the different login session.

19. The non-transitory computer-readable medium of claim 18, wherein the instructions further comprise instructions that, when executed by the one or more processors cause the computing device to, prior to executing the at least one representative state transfer (REST) call:

establish the login session with the server environment at least in part by communicating a token request to the server environment via a web browser of the local computing device, wherein the token request includes at least a user name, a password, and a server address, and where the user name, the password, and the server address are stored in the local file; and in response to communicating the token request, receive a token from the server environment via the web browser, where the token is inserted in or attached to subsequent representative state transfer (REST) calls for allowing the subsequent representative state transfer (REST) calls to be made within the same login session.

20. The non-transitory computer-readable medium of claim 18, wherein the executable content page includes at least one of javascript, hypertext markup language (HTML), and cascading style sheets (CSS), and wherein the at least one representative state transfer (REST) call is made to the server environment over a computer network.

* * * * *